United States Patent
Watanabe et al.

(10) Patent No.: US 10,211,777 B2
(45) Date of Patent: Feb. 19, 2019

(54) PHOTOVOLTAIC POWER GENERATOR OUTPUT ESTIMATION METHOD AND DEVICE, AND POWER SYSTEM MONITORING DEVICE USING SAME

(71) Applicants: Hitachi, ltd., Chiyoda-ku, Tokyo (JP); Tohoku Electric Power Co., Inc., Sendai-shi, Miyagi (JP); Tohoku Electric Manufacturing Co., Ltd, Tagajo-shi, Miyagi (JP)

(72) Inventors: Masahiro Watanabe, Tokyo (JP); Kenichiro Yamane, Tokyo (JP); Takuya Matsumoto, Tagajo (JP); Masatoshi Kumagai, Tokyo (JP); Tsukasa Oonishi, Tokyo (JP); Ryo Egashira, Tokyo (JP); Katsuhiro Matsuda, Sendai (JP); Jun Murakoshi, Tagajo (JP); Tomoya Sato, Tagajo (JP)

(73) Assignees: Hitachi, Ltd., Tokyo (JP); Tohoku Electric Power Co., Inc., Sendai-shi (JP); Tohoku Electric Manufacturing Co., Ltd., Tagajo-shi (JP)

( * ) Notice: Subject to any disclaimer, the term of this patent is extended or adjusted under 35 U.S.C. 154(b) by 133 days.

(21) Appl. No.: 15/113,245

(22) PCT Filed: Jan. 14, 2015

(86) PCT No.: PCT/JP2015/050727
§ 371 (c)(1),
(2) Date: Jul. 21, 2016

(87) PCT Pub. No.: WO2015/111473
PCT Pub. Date: Jul. 30, 2015

(65) Prior Publication Data
US 2017/0012580 A1    Jan. 12, 2017

(30) Foreign Application Priority Data

Jan. 22, 2014    (JP) .................... 2014-009218

(51) Int. Cl.
*G01C 21/00*    (2006.01)
*H02S 50/00*    (2014.01)
*H02J 3/38*    (2006.01)

(52) U.S. Cl.
CPC .............. *H02S 50/00* (2013.01); *H02J 3/383* (2013.01); *Y02E 10/563* (2013.01)

(58) Field of Classification Search
USPC ........................................... 701/439; 307/47
See application file for complete search history.

(56) References Cited

U.S. PATENT DOCUMENTS

| 8,301,365 | B2 * | 10/2012 | Niwa ........................ | B60L 3/12 701/439 |
| 2013/0054037 | A1 * | 2/2013 | Ikawa ....................... | G05F 1/67 700/286 |
| 2016/0019323 | A1 * | 1/2016 | Tsuruta ............. | H01L 31/02021 703/18 |

FOREIGN PATENT DOCUMENTS

| JP | 2006-33908 A | 2/2006 |
| JP | 2007-281060 A | 10/2007 |

(Continued)

OTHER PUBLICATIONS

International Search Report (PCT/ISA/210) issued in PCT Application No. PCT/JP2015/050727 dated Mar. 31, 2015, with English translation (four (4) pages).

(Continued)

*Primary Examiner* — Lam Nguyen
(74) *Attorney, Agent, or Firm* — Crowell & Moring LLP (57) ABSTRACT

The output of a photovoltaic power generator is estimated by estimating a solar radiation amount at a point different from (Continued)

solar radiation measurement points and determining an estimation error amount from solar radiation values measured at limited points. A photovoltaic power generator output estimation method estimates an output of a photovoltaic power generator based on a measured solar radiation value. The method includes a first estimation method of estimating a solar radiation amount at a photovoltaic power generator installation point from solar radiation meter installation point information, a value measured by a solar radiation meter, and photovoltaic power generator installation point information; a second estimation method of estimating the solar radiation amount at the photovoltaic power generator installation point in a manner different from that of the first estimation method; an output estimation method of estimating the output of the photovoltaic power generator from an estimated solar radiation amount and a rated capacity of the photovoltaic power generator; and an error estimation method of determining an estimation error of a photovoltaic power generator output from a difference between the first and second estimation methods.

7 Claims, 6 Drawing Sheets

(56) References Cited

FOREIGN PATENT DOCUMENTS

| | | |
|---|---|---|
| JP | 2011-58814 A | 3/2011 |
| JP | 2012-10508 A | 1/2012 |
| JP | 2012-44089 A | 3/2012 |
| JP | 2012-124188 A | 6/2012 |
| JP | 2013-9492 A | 1/2013 |
| JP | 2013-253805 A | 12/2013 |

OTHER PUBLICATIONS

Katsuhiro Matsuda et al., "Estimation Methods of Photovoltaic Power Generation in Distribution System", The 2013 Annual Meeting of the Institute of Electrical Engineers of Japan, 2013, pp. 199-201.

* cited by examiner

PHOTOVOLTAIC POWER GENERATOR OUTPUT ESTIMATION METHOD AND DEVICE, AND POWER SYSTEM MONITORING DEVICE USING SAME

FIELD OF THE INVENTION

The present invention relates to an output estimation method and device for a photovoltaic power generator connected to a power system, and also relates to a power system monitoring device using the output estimation method and device for the photovoltaic power generator. In particular, the present invention relates to a photovoltaic power generator output estimation method and device that calculates an estimated photovoltaic power generator output and an estimation error from solar radiation values measured at limited points by estimating, with plural methods, the amount of solar radiation at a point different from a solar radiation measurement point, and also relates to a power system monitoring device using the photovoltaic power generator output estimation method and device.

BACKGROUND ART

Power systems are controlled so as to not only equalize a power demand with a power generation amount at all times but also maintain voltages of various power system regions within a specified voltage range. For example, distribution system voltage control is exercised by changing tabs on a transformer (LRT or load ratio control transformer) installed at a distributing substation or by changing taps on an automatic voltage regulator (SVR or step voltage regulator) installed on a distribution line.

These voltage regulators (the LRT and the SVR) are set so that a tap change generally is made with a response time constant of several tens of seconds. Further, if a plurality of voltage regulators are installed in series on a distribution line, the response time constant of a voltage regulator installed on the far side of the distribution line (feeder) is generally set to be slower than that of a voltage regulator installed near a substation (power feeding side). This decreases the number of unnecessary operations of the voltage regulator installed on the far side of the distribution line.

As regards a distribution system used in recent years, however, an increasing number of consumers have a photovoltaic power generator PV. In such a situation, the power output of the photovoltaic power generator PV varies with weather changes to cause an abrupt voltage change in the distribution system.

However, the response time constant of a voltage regulator having a tap or other mechanical mechanism is generally slower than that of a voltage change phenomenon caused by quickly changing electrical power such as a load and photovoltaic power generator output.

As such being the case, a present control amount and control target value should preferably be determined, if possible, in consideration of predicted output changes in the photovoltaic power generator PV. To make such a determination, it is necessary to exercise proper tap control in accordance with the amount of power generated by the photovoltaic power generator PV.

In order to address the above concerns, it is important for the distribution system to predict an output change amount by properly estimating the amount of power output generated by the photovoltaic power generator PV in a substation bank, a feeder, and a switch interval unit.

The following well-known methods are used to determine and predict the electrical power output of the photovoltaic power generator PV. A method described in Non-Patent Document 1 is capable of accurately estimating the output of a photovoltaic power generator PV at an arbitrary point by using scarce information about an output measurement point of the photovoltaic power generator PV.

A method described in Patent Document 1 performs prediction by using not only a previous power generation amount of a host photovoltaic power generator PV but also the power generation amount of another photovoltaic power generator PV.

A method described in Patent Document 2 makes comparison with power generation time-series data and change patterns of another photovoltaic power generator PV, and predicts the power generation amount of the photovoltaic power generator PV based on similar data.

DOCUMENT LIST

Patent Document

PATENT DOCUMENT 1: JP 2007-281060
PATENT DOCUMENT 2: JP 2012-124188

Non-Patent Document

NON-PATENT DOCUMENT 1: "Estimation Methods of Photovoltaic Power Generation in Distribution System" The 2013 Annual Meeting of the Institute Of Electrical Engineers of Japan, 6-111 (2013)

SUMMARY OF INVENTION

Technical Problem

When the method described in Non-Patent Document 1 is used, the determined output of the photovoltaic power generator PV includes an error. However, a method of determining the magnitude of error is not described. Therefore, system control (supply-demand control and voltage control) cannot be exercised in consideration of risk caused by a power generation amount estimation error.

Further, when the method described in Patent Document 1 is used, it is difficult to change an employed model formula (a factor in the model formula) in accordance with an ever-changing power generation environment because the employed model formula is relatively rigid. It is also difficult to predict the power generation amount in accordance, for example, with cloud motion caused by a change in the direction of wind. Thus, it will be difficult, for example, to predict the power generation amount in the near future.

Moreover, the method described in Patent Document 2 is not developed in consideration of the magnitude of estimation error and the influence of temporal changes in the risk of estimation error.

The present invention has been made in view of the above circumstances and provides a photovoltaic power generator output estimation method and device as well as a power system monitoring device using such a device in order to, specifically from solar radiation values measured at limited points, estimate a solar radiation amount at a point different from solar radiation measurement points and determine an estimation error amount.

Solution to Problem

According to an aspect of the present invention, photovoltaic power generation output estimation method estimates an output of a photovoltaic power generator based on a measured solar radiation value, the photovoltaic power generator output estimation method comprising a first estimation method of estimating a solar radiation amount at a photovoltaic power generator installation point from solar radiation meter installation point information, a value measured by a solar radiation meter, and photovoltaic power generator installation point information; a second estimation method of estimating the solar radiation amount at the photovoltaic power generator installation point in a manner different from that of the first estimation method; an output estimation method of estimating the output of the photovoltaic power generator from an estimated solar radiation amount and a rated capacity of the photovoltaic power generator; and an error estimation method of determining an estimation error of a photovoltaic power generator output from a difference between the first estimation method and the second estimation method.

Advantageous Effects of Invention

The photovoltaic power generator output estimation method and estimation device according to the present invention makes it possible to (1) decrease the number of measuring devices required for photovoltaic power generator output estimation and prediction, (2) provide fail-safe design and control in consideration of an error in an estimated or predicted value, and (3) reduce an interconnection cost for the introduction of plural photovoltaic bower generators.

Other advantageous effects of the present invention will be explained in the subsequent description.

DESCRIPTION OF EMBODIMENT

An embodiment of the present invention will now be described with reference to the drawings.

Embodiment

Figure 2:
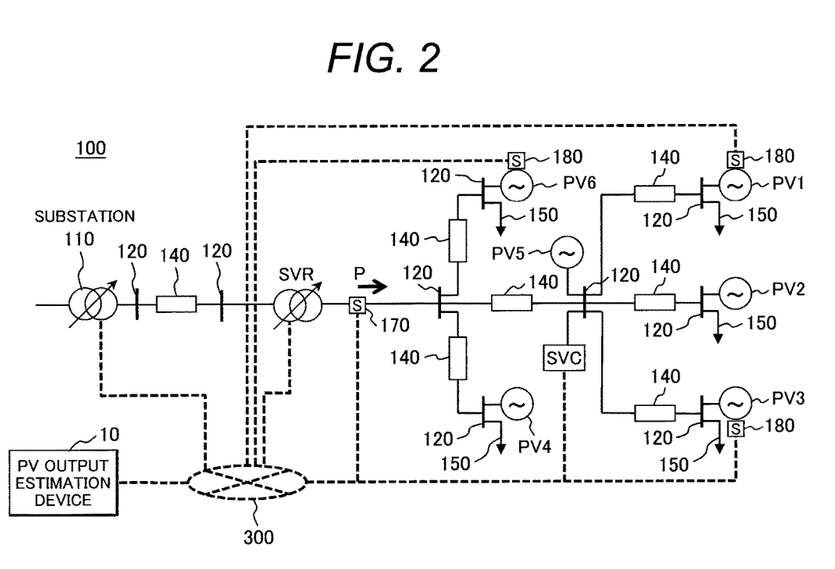
FIG. 2 is a diagram illustrating an exemplary distribution system in which photovoltaic power generators and solar radiation meters are installed.

FIG. 2 is a diagram illustrating an exemplary distribution system 100 (feeder) in which photovoltaic power generators PV and solar radiation meters 180 are installed. The typical distribution system 100 illustrated in FIG. 2 includes nodes (busbars) 120, distribution lines 140 connecting the nodes 120, loads 150 and photovoltaic power generators PV connected to the nodes 120, a sensor 170 installed on a distribution line, the solar radiation meters 180, a distribution substation 110, a static VAR compensator (SVC), and a voltage regulator (an automatic voltage regulator SVR in the example of FIG. 2).

The output of the solar radiation meter 180 is connected to a photovoltaic power generator output estimation device 10 through a communication network 300 in order to successively transmit measured values. The solar radiation meter is not always installed at the same location as a photovoltaic power generator. The solar radiation meter 180 may be installed near a photovoltaic power generator installation point in the distribution system 100 or installed in a different location such as a substation. That is, the solar radiation meter 180 is installed as appropriate in the distribution system 100. In some cases where the solar radiation meter 180 is installed, is not connected to the photovoltaic power generator output estimation device 10 through the communication network 300.

The example illustrated in FIG. 2 assumes that the solar radiation meters 180 are installed near the photovoltaic power generators PV1, PV3, PV6 but not installed near the photovoltaic power generators PV2, PV4, PV5. An alternative configuration may be employed so that instead of the output of the solar radiation meter, the output of a photovoltaic power generator PV is transmitted to the photovoltaic power generator output estimation device 10.

Further, the sensor 170, the distribution substation 110, the automatic voltage regulator SVR, and the static VAR compensator SVC are configured to be capable of transmitting information to the photovoltaic power generator output estimation device 10 through the communication network 300.

Based on data measured by the solar radiation meter 180, the photovoltaic power generator output estimation device 10 computes an estimated output value of a photovoltaic power generator PV in the feeder and an estimation error amount. When the estimated output value of a photovoltaic power generator PV in the feeder and the estimation error amount are determined and reflected in a power system monitoring device, the following advantageous effects on distribution system management are obtained.

Firstly, it is possible to determine a rate of the output of the photovoltaic power generator PV included in real power and reactive power detected by the sensor 170. This makes it possible to predict a power flow amount obtained when the output of the photovoltaic power generator PV drastically increases or decreases. As a result, monitoring can be conducted as needed to determine whether supply-demand control and voltage control can be exercised.

Further, in preparation for possible changes in the output of the photovoltaic power generator PV, the distribution substation 110, the automatic voltage regulator SVR, and the static VAR compensator SVC are able to exercise more efficient control by adjusting a present control amount and a control response speed.

Figure 3:
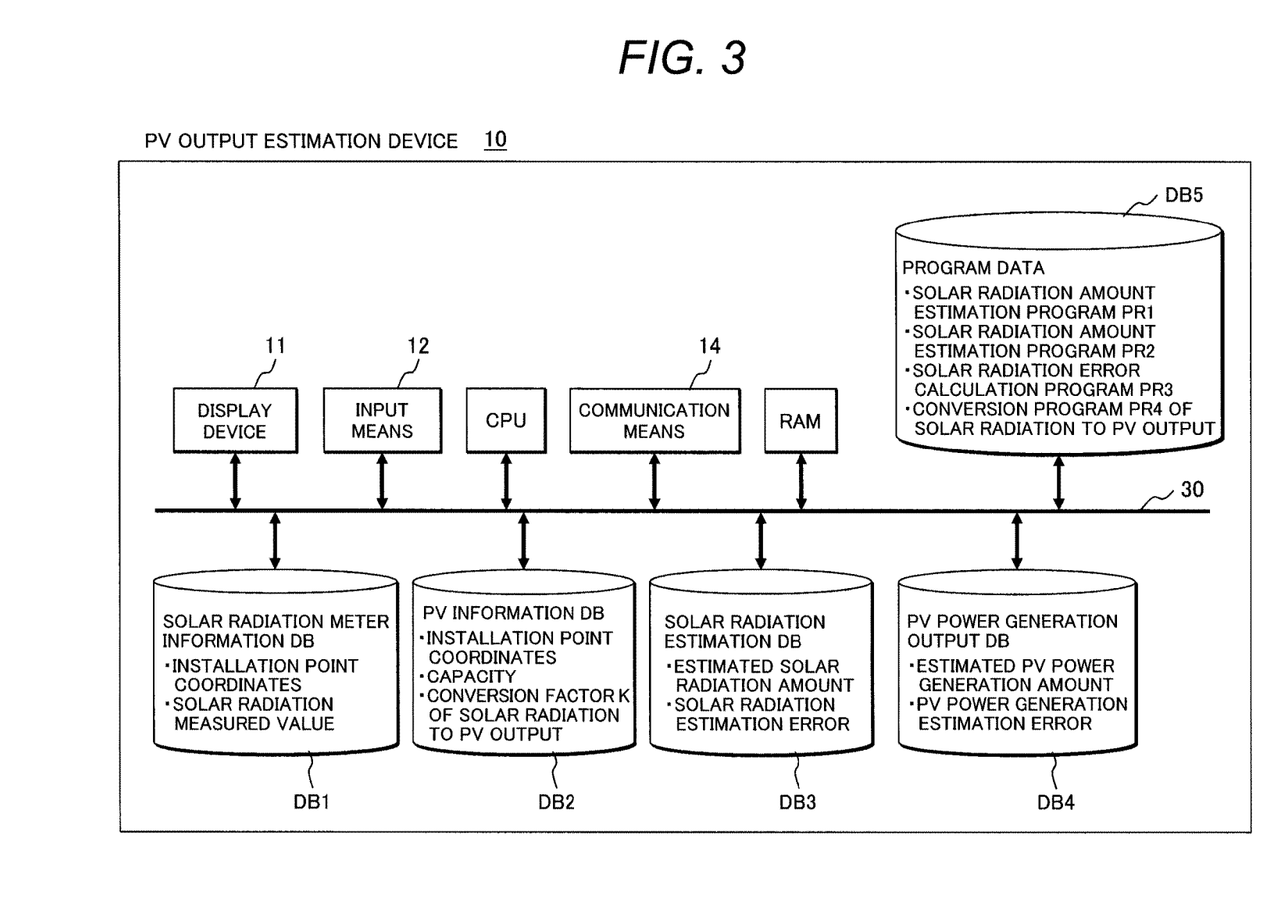
FIG. 3 is a diagram illustrating an exemplary configuration of the photovoltaic power generator output estimation device.

FIG. 3 is a diagram illustrating an exemplary configuration of the photovoltaic power generator output estimation device 10 according to an embodiment of the present invention. The output estimation device 10 is formed of a computer system in which a display device 11, an input means 12 such as a keyboard or a mouse, a computer CPU, communication means 14, a random-access memory RAM, and various databases are connected to a bus line 30. The output estimation device 10 includes a solar radiation meter information database DB1, a photovoltaic power generator information database DB2 a solar radiation estimation database DB3, a photovoltaic power generator output database DB4, and a program database DB5 as the databases DB of the computer system.

The computer CPU executes a calculation program to designate image data to be displayed or to search for data in various databases, for example. The random-access memory RAM temporarily stores solar radiation meter installation point coordinates, measured solar radiation data, photovoltaic power generator installation point coordinates and rated capacity, conversion factor data of solar radiation to photovoltaic power generation, and calculation result data such as estimated solar radiation amount data, solar radiation amount estimation error data, estimated photovoltaic power generator generation-amount data, and estimation error data. Based on these data, the computer CPU generates necessary image data and displays the generated image data on the display device 11 (a display screen, for example).

Five main databases DB are included in the photovoltaic power generator output estimation device 10. The solar radiation meter information database DB1 stores solar radiation meter installation point coordinates indicating geographical coordinates at which the solar radiation meter 180 is installed, and also stores measured solar radiation data which is chronologically measured by the solar radiation meter. Therefore, when the distribution system is configured as in FIG. 2, the amounts of solar radiation in the vicinity of the photovoltaic power generators PV1, PV3, PV6 are stored with time information for individual geographical coordinates.

The photovoltaic power generator information database DB2 stores photovoltaic power generator installation point coordinates indicating geographical coordinates at which the photovoltaic power generators PV are installed, the rated capacity of each photovoltaic power generator, and conversion factor data of solar radiation to photovoltaic power generation used to convert a solar radiation amount to a photovoltaic power generator output amount. Consequently, the amount of power generated by the photovoltaic power generator PV1 can be estimated, for example, from a solar radiation amount measured near the photovoltaic power generator PV1 on the basis of the rated capacity of the photovoltaic power generator PV1.

The solar radiation estimation database DB3 stores an estimated solar radiation amount calculated by a program and solar radiation amount estimation error calculation result data.

The photovoltaic power generator output database DB4 stores data such as an estimated photovoltaic power generator generation-amount calculated by a program and estimation error calculation result data.

The program database DB5 stores calculation programs such as plural different solar radiation amount estimation programs PR1, PR2, a solar radiation error calculation program PR3, and a conversion program PR4 of solar radiation to photovoltaic power generation output. The computer CPU loads these programs as needed to perform calculations.

Figure 1:
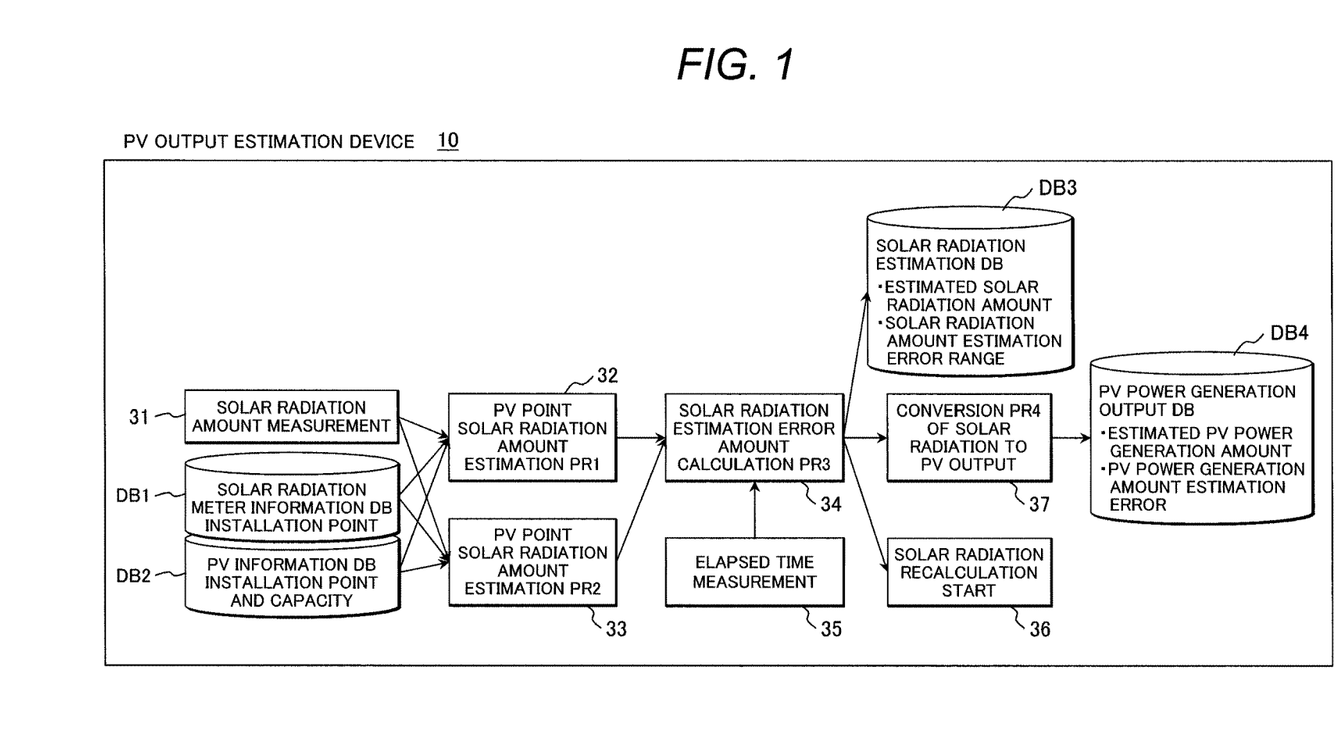
FIG. 1 is a diagram illustrating a configuration of processing functions of a photovoltaic power generator output estimation device.

With reference to FIG. 1, a configuration of processing functions of the photovoltaic power generator output estimation device 10 according to the present invention will be described. The photovoltaic power generator output estimation device 10 includes functional sections of a solar radiation amount measurement section 31, plural solar radiation amount estimation processing sections 32, 33, a solar radiation estimation error amount calculation section 34, an elapsed time measurement section 35, a solar radiation restart processing section 36, and a conversion section 37 of solar radiation to photovoltaic power generator output, and the four aforementioned databases of the solar radiation meter information database DB1, the photovoltaic power generator information data DB2, the solar radiation estimation data DB3, and the photovoltaic power generator output data DB4.

In FIG. 1, the solar radiation amount measurement section 31 corresponds to an input section that inputs data measured by the solar radiation meter 180 to the photovoltaic power generator output estimation device 10 through the communication network 300. The solar radiation amount measurement section 31 may be regarded as a section that acquires measured solar radiation data stored in the solar, radiation meter information database DB1.

The solar radiation amount estimation processing sections 32, 33 are processing functions to execute the plural different solar radiation amount estimation programs PR1, PR2 which are included in the calculation programs stored in the program database DB5. For example, the solar radiation amount estimation processing section 32 executes the solar radiation amount estimation program PR1 to estimate the amount of solar radiation, and the solar radiation amount estimation processing section 33 executes the solar radiation amount estimation program PR2 to estimate the amount of solar radiation by using the same data as the solar radiation amount estimation processing section 32 does.

The solar radiation amount estimation processing sections 32, 33 acquire measured solar radiation values from the solar radiation amount measurement section 31, acquire solar radiation meter installation point coordinates from the solar radiation meter information database DB1, receive the photovoltaic power generator installation point coordinates, the rated capacity of each photovoltaic power generator, and the conversion factor of solar radiation to photovoltaic power generation from the photovoltaic power generator information database DB2, and calculate the amount of solar radiation at each photovoltaic power generator installation point. The solar radiation amount estimation processing sections 32, 33 estimate the solar radiation amount by using different methods from each other. The different computation methods used by the solar radiation amount estimation processing sections 32, 33 will be described later with reference to FIGS. 5, 6, and 7.

The solar radiation estimation error amount calculation section 34 is a processing function to execute the solar radiation error calculation program PR3 included in the calculation programs stored in the program database DB5. The solar radiation estimation error amount calculation section 34 receives from the solar radiation amount estimation processing sections 32, 33 solar radiation amount calculation results which are produced by different computation methods for the individual photovoltaic power generator installation points, and calculates a solar radiation estimation error amount from the difference between the received solar radiation amount calculation results. For processing in the solar radiation estimation error amount calculation section 34, the elapsed time measurement section 35 measures the elapsed time from the instant at which the solar radiation amount and the solar radiation estimation error amount were last calculated, and passes the result of measurement to the solar radiation estimation error amount calculation section 34.

The solar radiation estimation error amount calculated by the solar radiation estimation error amount calculation section 34 and the estimated solar radiation amounts calculated by the solar radiation amount estimation processing sections 32, 33 are stored in the solar radiation estimation database DB3 and also passed to the conversion section 37 of solar radiation to photovoltaic power generation output.

The conversion section 37 of solar radiation to photovoltaic power generation output is a processing function to execute the conversion program PR4 of solar radiation to photovoltaic power generation output, included in the calculation programs stored in the program database DB5. The conversion section 37 converts a solar radiation amount to a photovoltaic power generator output amount by using the rated capacity of a photovoltaic power generator and the conversion factor of solar radiation to photovoltaic power generation, and stores the photovoltaic power generator output amount in the photovoltaic power generator output database DB4.

The solar radiation restart processing section 36 restarts a photovoltaic power generator output estimation process when a predetermined period of time elapses after the last exercise of the photovoltaic power generator output estimation process. That is to say, the solar radiation restart processing section 36 gives a trigger signal to perform computations at a predetermined time interval.

Figure 4:
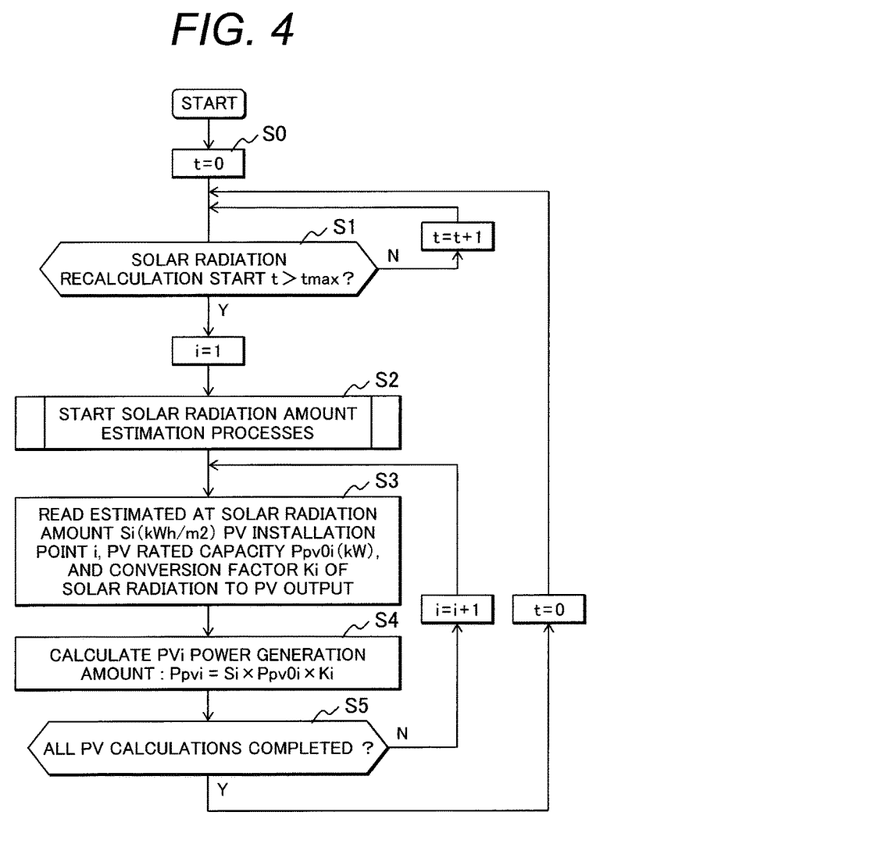
FIG. 4 is a flowchart illustrating a process of converting an estimated solar radiation amount to a photovoltaic power generator output value.

With reference to FIG. 4, a flow will be described which shows an exemplary photovoltaic power generator output estimation method of converting an estimated solar radiation amount to a photovoltaic power generator output value. First of all, in processing step S0 of the flow, the value of time t which is measured by the elapsed time measurement section 35 is initialized to 0 (zero).

Processing step S1 is a block corresponding to a processing operation performed by the solar radiation restart processing section 36. Solar radiation amount estimation starts when the value of time t which is measured by the elapsed time measurement section 35 exceeds a predetermined time tmax. This makes it possible to successively perform the estimation computations at predetermined time interval.

In processing step S2, plural solar radiation amount estimation processes are performed based on different computation methods. That is to say, the solar radiation amount estimation processing sections 32, 33 perform their respective processes. The different computation methods used by the solar radiation amount estimation processing sections 32, 33 and the details of methods of determining the estimated photovoltaic power generator solar radiation amount and the estimation error will be described later with reference to FIGS. 5, 6, and 7.

In processing step S3, plural solar radiation amount estimation, processing calculation results are read. More specifically, the estimated solar radiation amount Si (kWh/m$^2$) of a photovoltaic power generator installation point i, the rated capacity Ppv0i (kW) of a photovoltaic power generator, and a conversion factor Ki of solar radiation to photovoltaic power generation output are read. Note that the installation points i of the photovoltaic power generator and the solar radiation meter may be in the vicinity of each other, not needed to be exactly the same with each other.

In processing step S4, the read solar radiation amount is converted to a photovoltaic power generator output amount Ppvi. More specifically, equation (1) is executed.

$$Ppvi = Si \times Ppv0i \times ki \qquad (1)$$

In processing step S5, it is determined whether calculations are performed for all the photovoltaic power generators. If the calculations are completed, time t is reset to 0 (zero) and processing returns to the beginning.

Figure 9:
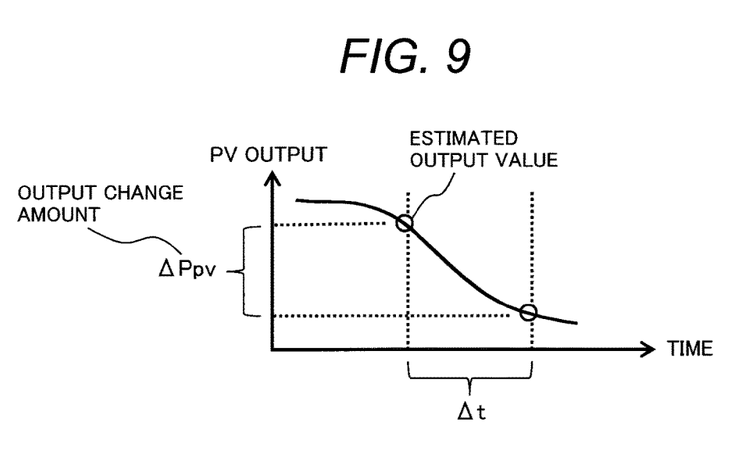
FIG. 9 is a diagram illustrating an idea of determining an estimated photovoltaic power generator solar radiation change amount and an estimation error.

The process performed by the photovoltaic power generator output estimation device 10 has been described. An estimated photovoltaic power generator solar radiation change amount and an estimation error can be similarly determined instead of the estimated photovoltaic power generator solar radiation amount and the estimation error. As illustrated in FIG. 9, the estimated photovoltaic power generator solar radiation change amount and the estimation error can be determined by calculating the amount of output change ΔPpv caused at a time interval Δt, as in the above-described process.

An exemplary process performed by the solar radiation amount estimation processing sections 32, 33 in FIG. 1 or performed in processing step S2 of FIG. 4 will now be described. As the different methods, (1) a linear interpolation method and (2) a representative value method will be explained.

Figure 5:
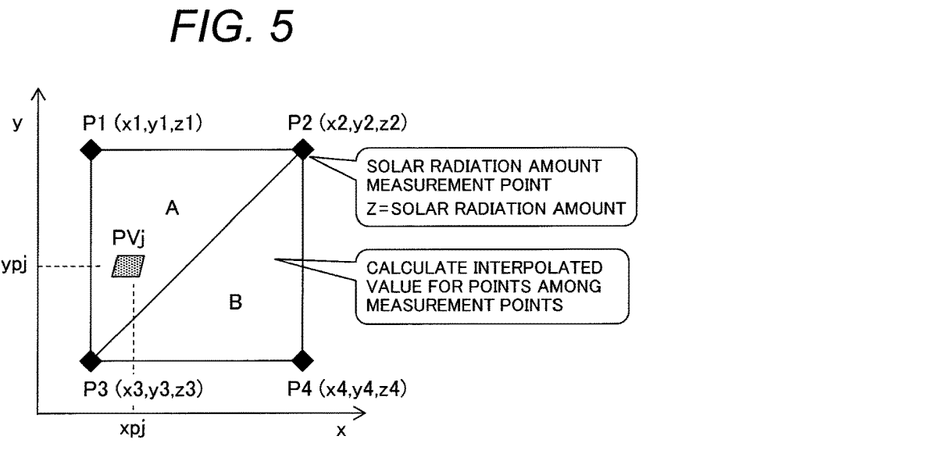
FIG. 5 is a diagram illustrating an idea of a linear interpolation method as an example of a solar radiation amount estimation method.

FIG. 5 is a conceptual diagram illustrating the idea of the linear interpolation method as an example of a solar radiation amount estimation method. This estimation method calculates the solar radiation at a photovoltaic power generator installation point from solar radiation values measured at three solar radiation measurement points near the photovoltaic power generator installation point in proportion with distance considering the geographical positions. In FIG. 5, the x-axis and the y-axis represent geographical coordinates, and the z-axis represents a photovoltaic power generator output at individual coordinates. Here, a solar radiation amount PVj will be estimated at a point j (coordinates (xpj, ypj)) in FIG. 5 at which a photovoltaic power generator is installed.

It is assumed that the solar radiation amount has been measured at plural points near the point j to acquire the solar radiation information together with relevant geographical information. In FIG. 5, it is assumed that the amount of solar radiation at each of four points, points P1, P2, P3, and P4 and relevant geographical information are acquired. In this case, the photovoltaic power generator output among the measurement points is expressed by a plane passing through three arbitrarily selected nearby points (P1 (x1, y1, z1), P2 (x2, y2, z2), P3 (x3, y3, z3)), and the photovoltaic power generator output z at the point j is expressed by Equation (2):

$$z = ax + by + c \qquad (2)$$

where the values a, b, and c are uniquely determined by solving simultaneous equations.

In the above instance, the solar radiation amount PVj at the point j (coordinates (xpj, ypj)) is defined by a plane that is contained in a triangle A enclosed by the measurement points P1, P2, P3 and passes through coordinates corresponding to the measurement points. It is conceivable that the plane may be contained in a different triangle like a triangle B. To avoid this, three measurement points at a short distance from the photovoltaic power generator installation point should be used.

Figure 6:
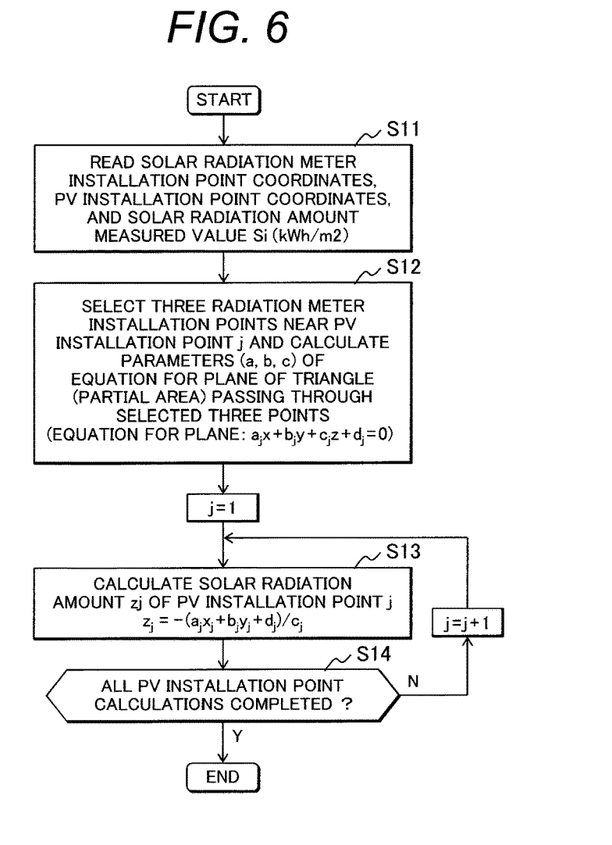
FIG. 6 is a flowchart illustrating a process performed by using the linear interpolation method.

FIG. 6 is a flowchart illustrating a process performed by using the linear interpolation method.

In processing step S11, solar radiation meter installation point coordinates, photovoltaic power generator installation point coordinates, and a measured solar radiation amount Si (kWh/m$^2$) axe read.

In processing step S12, three solar radiation meter installation points near a photovoltaic power generator installation point j are selected. Parameters (a, b, c) of an equation for the plane of the triangle A (partial area) passing through the three selected points are then calculated. As mentioned earlier, the equation for the plane is represented by Equation (3).

$$a_j x + b_j y + c_j z + d_j = 0 \quad (3)$$

In processing step S13, a solar radiation amount $z_j$ is calculated at the photovoltaic power generator installation point j. Equation (4) can be used to calculate $z_j$.

$$z_j = -(a_j x_j + b_j y_j + d_j)/c_j \quad (4)$$

In processing step S14, it is determined whether calculations are performed for all the photovoltaic power generators. If the calculations are not performed for all the photovoltaic power generators, processing returns to processing step S13.

Figure 7:
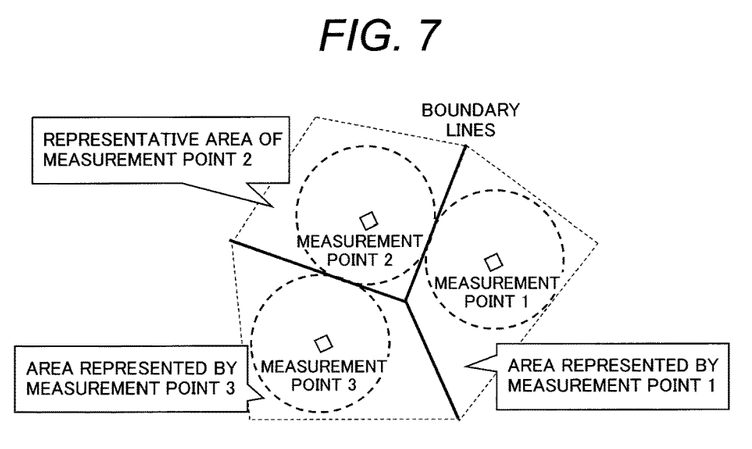
FIG. 7 is a diagram illustrating an idea of the representative value method, which is another example of the solar radiation amount estimation method.

FIG. 7 is a conceptual diagram illustrating an idea of the representative value method which is another example of the solar radiation amount estimation method. The representative method uses a particular solar radiation meter as a representative and considers that the solar radiation amount at a nearby photovoltaic power generator point is equal to the solar radiation amount measured by the representative. In selecting the representative solar radiation meter, a measurement point nearest the photovoltaic power generator installation point is selected. A Voronoi diagram (Voronoi tessellation) may be used for this method. The Voronoi diagram is obtained, in a situation where plural points (kernel points) are disposed at arbitrary positions in a distance space, by forming regions depending on which kernel point is near other points in the same distance space. In particular, in the case of a two-dimensional Euclidean plane, each of the boundary lines between the regions is a part of a bisector of individual kernel points.

In Voronoi tessellation, the boundary lines are determined in such a manner that the distances are equal. In such an instance, a set of points equidistant from the kernel points is represented by a circle. In this manner, the solar radiation amount at each photovoltaic power generator installation point can be estimated.

Figure 8:
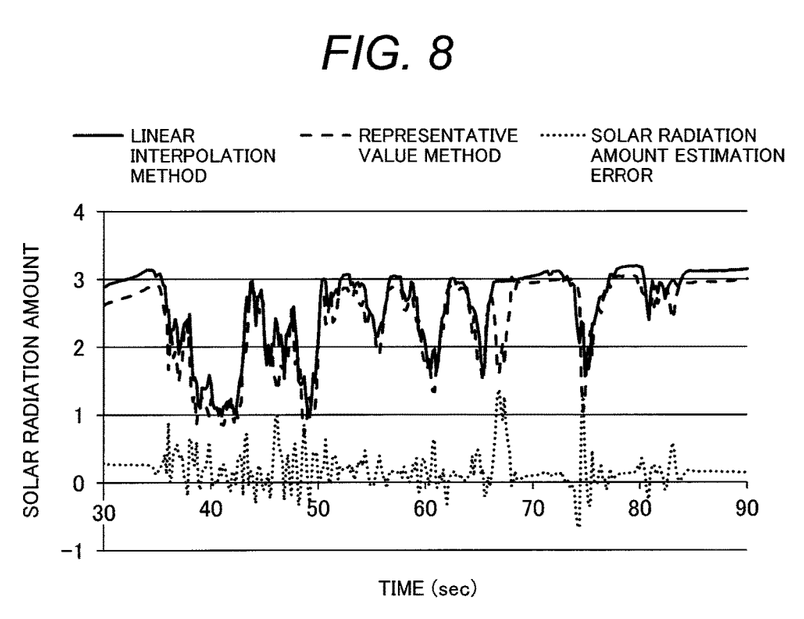
FIG. 8 is a diagram illustrating an example of calculating an estimated solar radiation amount and an estimation error amount.

FIG. 8 illustrates an example of calculating an estimated solar radiation amount and an estimation error amount. The example shows a case where the solar radiation amount at a photovoltaic power generator installation point is estimated by two different estimation methods, namely, the linear interpolation method and the representative value method. The linear interpolation method, which is indicated by a thick solid line, and the representative value method, which is indicated by a thick broken line, yield different calculation results with each other of solar radiation amounts at each point of time depending on the difference in the employed estimation algorithm. The difference (thin dotted line) between the calculation results produced by the two different methods is indicated as a solar radiation amount estimation error.

The calculation results indicate that values estimated by the two different methods show the same variation tendency in the long term on the order of ten seconds in the example of FIG. 8) and show difference in the short term (on the order of one second in the example of FIG. 8). Based on the above calculation results, the solar radiation amounts estimated by the linear interpolation method, the representative value method, and the average of these amounts should be used as estimated solar radiation amounts for actual operations. These values may be utilized for various system control on the presumption that the values contain a solar radiation amount estimation error.

The above-described functions provided by the present invention make it possible to calculate a photovoltaic power generator generation-amount and an error amount. Consequently, for example, system supply-demand control and voltage control can be accurately exercised in consideration of the risk of error.

That is to say, when an estimated output value and an output estimation error value, which are the results produced by the photovoltaic power generator output estimation device exemplified in FIG. 1, are reflected in the power system monitoring device, the following distribution system management effects are obtained.

When, for example, an estimated output value and an output estimation error value are given to the power system monitoring device which exercises supply-demand control and voltage control, it is possible to determine the rate of the output of a photovoltaic power generator PV included in real power and reactive power detected by the sensor 170. Consequently, it is possible to predict a power flow amount obtained when the output of the photovoltaic power generator PV drastically increases or decreases. As a result, monitoring can be conducted as needed to determine whether supply-demand control and voltage control can be exercised. In addition, such control operations can be performed.

Further, in a situation where the power system monitoring device is to perform monitoring and control operations by using the distribution substation 110, the automatic voltage regulator SVR, and the static VAR compensator SVC, more efficient monitoring and control operations can be exercised by adjusting the present control amount and the control response speed in preparation for possible changes in the output of the photovoltaic power generator PV.

Furthermore, as another exemplary application of a power system control device, a load amount can be determined from a value measured by a sensor on a line because the amount of power generated by a photovoltaic power generator can be determined. Additionally, when error is taken into consideration, a load amount estimation error amount can also be determined. This makes it possible to prevent an overload or load interchange as appropriate in consideration of an abrupt disconnection of a photovoltaic power generator.

Moreover, when the amount of power currently generated by a photovoltaic power generator is determined, it is possible to estimate that an abrupt change in the output of the photovoltaic power generator will be at most an increase from a present value to the maximum value of the capacity of the photovoltaic power generator or a decrease to 0 (zero). This minimizes a spinning reserve and a voltage control margin with respect to changes in the output of the photovoltaic power generator. This makes it possible to suppress a decrease in power generator efficiency and reduce a voltage regulator capacity. As a result, the cost of system operation and facility can be reduced.

The configuration illustrated in FIG. 1 determines solar radiation amounts and a relevant error amount by using different methods and then performs conversion to obtain an estimated power amount. An alternative process would be a process to determine the solar radiation amounts by using different methods, then convert the determined solar radiation amounts to estimated power amounts, and determine an error between the estimated power amounts as the difference between the estimated power amounts.

In any case, the present invention, which addresses a problem that the amount of error contained in a detected photovoltaic power generation amount cannot be estimated, provides devices and method that are configured and devised, applicable to subsequent control operations based on the novel idea that the difference between estimated power outputs computed by different methods corresponds to an output error amount.

INDUSTRIAL APPLICABILITY

The present invention can be utilized as a device for determining the output of a photovoltaic power generator for a power system or as a device for estimating the amount of change in the output of a photovoltaic power generator. When used to determine the spinning reserve of a supply-demand adjustment device for a power system, the present invention can be utilized to exercise the functionality, for example, of a frequency adjustment device and of an economical load dispatching device. Further, the present invention can be utilized to exercise the functionality of a voltage adjustment device, a distribution system load interchange determination device, or a distribution automation system. Furthermore, the present invention can be utilized in a distribution system to maintain voltage or increase the availability of distribution facilities in response to the additional installation of distributed power supplies, for instance, for photovoltaic power generation.

EXPLANATION OF REFERENCE CHARACTERS

10: Photovoltaic power generator output estimation device
11: Display device
12: Input means such as keyboard and mouse
CPU: Computer
14: Communication means
RAM: Random-access memory
DB1: Solar radiation meter information database
DB2: PV information database
DB3: Solar radiation estimation database
DB4: PV power generation output database
DB5: Program database
31: Solar radiation amount measurement section
32, 33: Solar radiation amount estimation processing sections
34: Solar radiation estimation error amount calculation section
35: Elapsed time measurement section
36: Solar radiation restart processing section
37: Conversion section of solar radiation to photovoltaic power generation output
100: Distribution system
110: Distribution substation
120: Node
130: Photovoltaic power generator
140: Distribution line
150: Load
SVR: Automatic voltage regulator
170: Sensor
180: Solar radiation meter
SVC: Static VAR compensator

What is claimed is:

1. A photovoltaic power generation output estimation method that estimates an output of a photovoltaic power generator based on a measured solar radiation value, the photovoltaic power generation output estimation method comprising:
    estimating, using a first estimation method, a first solar radiation amount at a photovoltaic power generator installation point based on solar radiation meter installation point information, a value measured by a solar radiation meter, and photovoltaic power generator installation point information;
    estimating a second solar radiation amount at the photovoltaic power generator installation point using a second estimation method that is different from the first estimation method;
    estimating a first output of the photovoltaic power generator based on the first solar radiation amount and a rated capacity of the photovoltaic power generator, and a second output of the photovoltaic power generator based on the second solar radiation amount and the rated capacity of the photovoltaic power generator; and
    determining an estimation error of a photovoltaic power generator output based on a difference between the first output estimated using the first estimation method and the second output estimated using the second estimation method.

2. The photovoltaic power generation output estimation method according to claim 1,
    wherein the first estimation method or the second estimation method of estimating a photovoltaic power generator generation-amount is based on a linear interpolation method or a representative value method.

3. The photovoltaic power generation output estimation method according to claim 1,
    wherein an estimated solar radiation change amount and a solar radiation change amount estimation error are determined based on an estimated solar radiation amount and a solar radiation amount estimation error.

4. A photovoltaic power generation output estimation device that estimates an output of a photovoltaic power generator based on a measured solar radiation value, the photovoltaic power generation output estimation device comprising:
    first estimation means of estimating, using a first estimation method, a first solar radiation amount at a photovoltaic power generator installation point based on solar radiation meter installation point information, a value measured by a solar radiation meter, and photovoltaic power generator installation point information;
    second estimation means of estimating a second solar radiation amount at the photovoltaic power generator installation point using a second estimation method that is different from the first estimation method;
    output estimation means of estimating a first output of the photovoltaic power generator based on the first solar radiation amount and a rated capacity of the photovoltaic power generator, and a second output of the photovoltaic power generator based on the second solar radiation amount and the rated capacity of the photovoltaic power generator; and
    error estimation means of determining an estimation error of a photovoltaic power generator output based on a difference between the first output estimated using the first estimation method and the second output estimated using the second estimation method.

5. The photovoltaic power generation output estimation device according to claim 4,
    wherein the first estimation method or the second estimation method of estimating a photovoltaic power generator generation-amount is based on a linear interpolation method or a representative value method.

6. The photovoltaic power generation output estimation device according to claim 4,
wherein an estimated solar radiation change amount and a solar radiation change amount estimation error are determined based on an estimated solar radiation amount and a solar radiation amount estimation error.

7. A power system monitoring device that uses first and second estimated outputs of a photovoltaic power generator and an output estimation error of the photovoltaic power generator for controlling a power system, the first and second estimated outputs being estimated by different estimation methods, and the output estimation error being determined based on a difference between the first estimated output and the second estimated output,
wherein the power system monitoring device acquires the first and second estimated outputs and the output estimation error from a photovoltaic power generation output estimation device, wherein the photovoltaic power generation output estimation device estimates an output of a photovoltaic power generator based on a measured solar radiation value, and the photovoltaic power generation output estimation device comprises:
first estimation means of estimating, using a first estimation method, a first solar radiation amount at a photovoltaic power generator installation point based on solar radiation meter installation point information, a value measured by a solar radiation meter, and photovoltaic power generator installation point information;
second estimation means of estimating a second solar radiation amount at the photovoltaic power generator installation point using a second estimation method that is different from the first estimation method;
output estimation means of estimating the first estimated output of the photovoltaic power generator based on the first solar radiation amount and a rated capacity of the photovoltaic power generator, and the second estimated output of the photovoltaic power generator based on the second solar radiation amount and the rated capacity of the photovoltaic power generator; and
error estimation means of determining the output estimation error based on a difference between the first estimated output using the first estimation method and the second estimated output using the second estimation method.

* * * * *